United States Patent
Bales et al.

[11] Patent Number: 5,467,528
[45] Date of Patent: Nov. 21, 1995

[54] METHOD OF MAKING A TUBULAR THERMAL STRUCTURE

[75] Inventors: Daniel A. Bales, Palm City; Mark L. Hartman, Tequesta, both of Fla.

[73] Assignee: United Technologies Corporation, Hartford, Conn.

[21] Appl. No.: 812,318

[22] Filed: Dec. 23, 1991

[51] Int. Cl.$^6$ ................................................ B23P 15/00
[52] U.S. Cl. ................................. 29/890.01; 29/890.038; 165/170
[58] Field of Search ................. 29/890.01, 890.038, 29/890.04, 890.042, 890.043, 890.053; 165/170, 166, 134.1; 228/193, 195, 183, 181

[56] References Cited

U.S. PATENT DOCUMENTS

| | | | |
|---|---|---|---|
| 2,958,183 | 11/1960 | Singelmann et al. | 29/890.01 |
| 3,069,850 | 12/1962 | Ledwith et al. | 29/890.01 |
| 3,086,358 | 4/1963 | Turnavicus | 29/890.01 |
| 3,190,070 | 6/1965 | Neu, Jr. | 29/890.01 |
| 3,224,678 | 12/1965 | Rosman | 29/890.01 |
| 3,349,464 | 10/1967 | Becker, Jr. et al. | 29/890.01 |
| 3,690,103 | 9/1972 | Dederra et al. | 29/890.01 |
| 3,714,695 | 2/1973 | Beeson | 29/890.01 |
| 3,897,316 | 7/1975 | Huang | 29/890.01 |
| 4,531,271 | 7/1985 | Lechner et al. | 29/890.01 |
| 4,942,653 | 7/1990 | Hawkinson | 29/890.01 |

*Primary Examiner*—Irene Cuda
*Attorney, Agent, or Firm*—Christopher T. Hayes

[57] ABSTRACT

A method of producing a tubular thermal structure in which cooling tubes are sandwiched between first and second members which are in turn sandwiched between first and second fixtures which fix the relative relationship of the members. The tubes, members and fixtures are then heated to a temperature at which plastic or superplastic deformation of the tubes will occur, and each tube is then subjected to a pressure differential sufficient to cause each tube to expand into intimate contact with adjacent tubes and the first and second members. The pressure is maintained until each of the tubes bonds to the adjacent tubes and the first and second members.

24 Claims, 4 Drawing Sheets

METHOD OF MAKING A TUBULAR THERMAL STRUCTURE

FIELD OF THE INVENTION

This invention is related to thermally cooled structures, and particularly to a method for forming such structures.

BACKGROUND OF THE INVENTION

Cooled heat exchange elements, such as the thermal skin proposed for hypersonic aircraft, are costly to design and manufacture due to the need to obtain both cooling and structural strength from the same element. In particular, the large panels necessary to produce the thermal skin for a large vehicle would be both labor intensive and quite costly to produce using present manufacturing techniques. Consequently, manufacturers of such heat exchange elements are seeking new ways of reducing the costs of producing cooled structural elements.

A typical structural panel shown in U.S. Pat. No. 3,739,843 to Haberski which discloses a structural panel formed from two sheets which have extended surface elements which are interposed to form a honeycomb structure. Unfortunately, the structural panel has no defined coolant flowpaths, and the cost associated with trying to assemble large structural panels using this design would likely be prohibitive. A typical example of a multiple panel heat exchanger is shown in U.S. Pat. No. 4,253,520 to Friedericy et al, which discloses a corrugated sheet sandwiched between two panels. The formed sheet must be welded or brazed to the panels to form individual flow passages, and the structural integrity of these welds is difficult to inspect.

What is needed is a method of making a tubular thermal structure having defined coolant flowpaths, which provides structural strength and is readily inspectable.

SUMMARY OF THE INVENTION

It is therefore an object of the present invention to provide a method of making a tubular thermal structure having defined coolant flowpaths, which provides structural strength and is readily inspectable.

According to the present invention first and second members, between which are sandwiched a plurality of tubes, are sandwiched between first and second fixtures which fix the relative relationship of the members. The tubes, members and fixtures are then heated to a temperature at which plastic or superplastic deformation of the tubes will occur, and each tube is then subjected to a pressure differential sufficient to cause each tube to expand into intimate contact with adjacent tubes and the first and second members. The pressure is maintained until each of the tubes bonds to the adjacent tubes and the first and second members.

The foregoing and other features and advantages of the present invention will become more apparent from the following description and accompanying drawings.

BEST MODE FOR CARRYING OUT THE INVENTION

Figure 1:
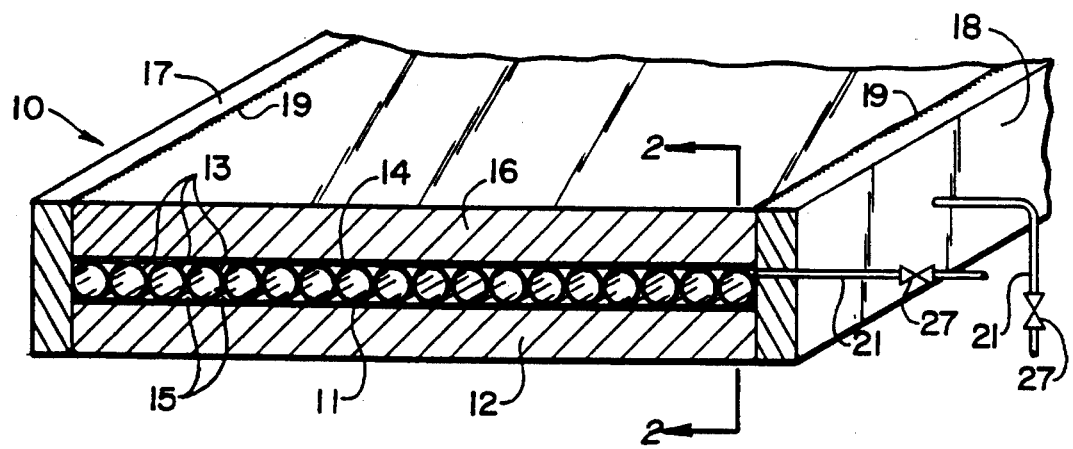
FIG. 1 is a cross-sectional view of an apparatus for practicing the method of the present invention.

FIG. 1 shows an assembly 10 utilizing the present invention. A first member 11, such as a sheet made of material having high thermal conductivity, is positioned on a first fixture 12 to which a releasing agent has been applied to prevent bonding between the fixture 12 and the first member 11. A plurality of tubes 13 are then positioned onto the sheet 11, preferably in side-by-side relationship as shown in FIG. 1. A second member 14 such as a second sheet of material similar to the first member 11 is then positioned on the plurality of tubes 13, thereby sandwiching the tubes 13 between the sheets 11, 14. Due to the shape of the tubes 13, interstices 15 are formed, bounded by adjacent tubes 13 and the sheets 11, 14. A second fixture 16 which is coated with a similar releasing agent is then positioned on the second member 14, thereby fixing the relative positions of the first and second fixtures 12, 16, the first and second members 11, 14 and the tubes 13. Side plates 17, 18 are then sealingly welded 19 to the first and second fixtures to prevent the tubes from expanding beyond the sides of the first and second fixtures 12, 16, leaving only the ends 20 of the fixtures 12, 16 exposed. One of the side plates 18 has one or more purge lines 21, extending therethrough which are discussed in greater detail below.

Figure 2:
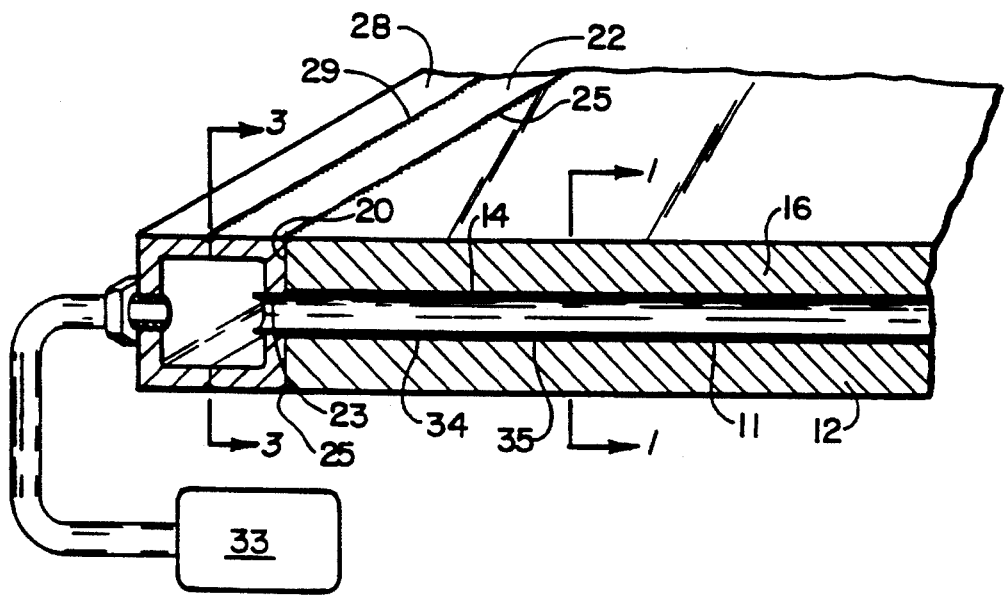
FIG. 2 is a cross-sectional view of the apparatus of FIG. 1 taken along line 2—2.
Figure 3:
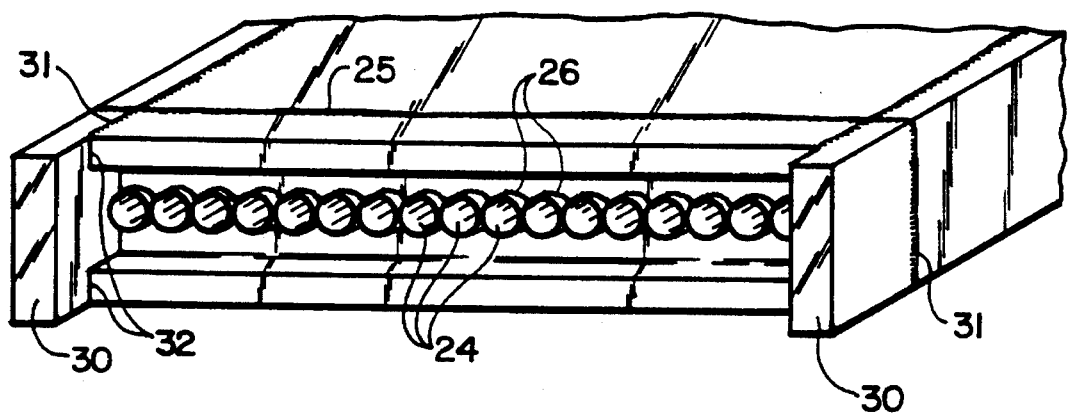
FIG. 3 is an end view of the manifold taken along line 3—3 of FIG. 2 showing the welded tube ends therein.
Figure 4:
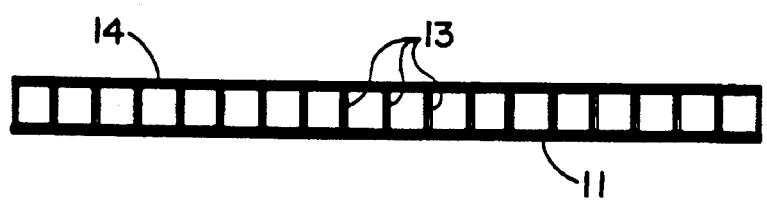
FIG. 4 is the resulting tubular structure from the apparatus of FIG. 1 and the method of the present invention.

A first manifold base 22 is positioned over at least one end 20 of the fixtures 12, 16 with the end 23 of each tube 13 extending through one of the holes 24 in the base 22. The first manifold base 22 is then sealingly welded 25 to one end 20 of the fixtures 12, 16 and side plates 17, 18, and the first end 23 of each tube 13 is then sealingly welded 26 to the first manifold base 22, as shown in FIGS. 2 and 3. The second end (not shown) of each tube is sealingly welded to a second manifold base which is welded to the fixtures 12, 16 and side plates 17, 18 in the same manner as the welding of the first manifold base 22. An isolated volume bounded by the fixtures 12, 16, the manifold bases 22, and the side plates 17, 18, and including the interstices 15, is thus formed such that the isolated volume communicates with ambient only through the purge lines 21. A valve 27 on each purge line 21 provides for the purge line 21 to be selectively opened or closed. As those skilled in the art will readily appreciate, depending on the application, the second end of each tube 13 may be sealed off by welding the second end shut, and a base plate similar to the side plates can be sealingly welded to the fixtures 12, 16 and side plates 17, 18, thereby enclosing the second tube ends. A manifold cap 28 is then sealingly elded 29 to the manifold base 22, and an end plate 30 is sealingly welded 31 to the longitudinal ends 32 of the manifold base 22 and cap 28, thereby sealing the ends 32 thereof. The end plates 30 are shown in FIG. 3 with the manifold cap 28 removed for clarity. The sealed tubes 13 are then pressure checked to insure that there are no leaks in the tubes 13 or manifolds 22, 28. The entire assembly, including fixtures 12, 16, sheets 11, 14, tubes 13, manifolds 22, 28 and plates 17, 18, 30, is then placed into a welded hydrogen retort, of the type well known in the art, and placed inside a box furnace. With the purge line valve 27 open, the assembly is heated while the manifolds 22, 28 are pressurized with argon gas supplied thereto from a high pressure source 33 until a temperature is reached at which the tubes 13 become plastic or superplastic. Since the hydrogen atmosphere surrounding each tube 13 is essentially at ambient pressure, the force exerted by the high pressure (typically 500 to 30,000 psia) argon gas subjects the inside 34 of each tube 13 to a much greater pressure than the outside 35 thereof, causing each tube 13 to expand or inflate into intimate contact with adjacent tubes 13 and the first and second members 11, 14. The expanding tubes 13 fill into the interstices 15 and substantially eliminate them. The pressure and temperature are then maintained at a level where each of the tubes 13 diffusion bonds to the adjacent tubes 13 and the first and second members 11, 14. Once bonding is complete, the temperature and pressure are reduced to ambient and the fixtures 12, 16, manifolds 22, 28 and plates 17, 18, 30 are separated from the sheets 11, 14 and tubes 13, and the tubes 13 are integral with the sheets 11, 14, as shown in FIG. 4.

Figure 5:
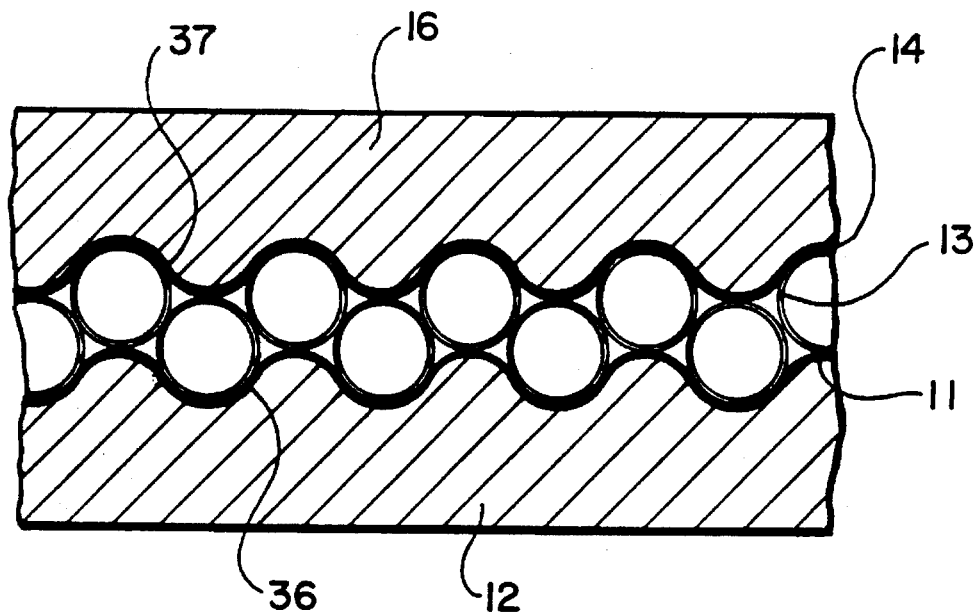
FIG. 5 is a cross-sectional view of an alternate apparatus for practicing the present invention.
Figure 6:
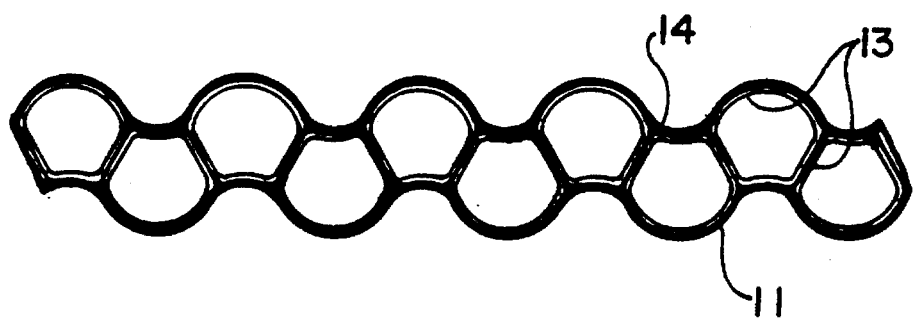
FIG. 6 is a cross-sectional view of the resulting structure from using the apparatus of FIG. 5 and the method of the present invention.

FIG. 5 shows an alternate embodiment of the present invention in which each fixture 12, 16 has a sinusoidal corrugated surface 36, 37, and each of the first and second members 11, 14 are made of sheets which conform to the sinusoidal corrugated surfaces 36, 37. As used herein, the term "sinusoidal corrugated surface" refers to a surface defined by a series of parallel lines which intersect a sinusoidal curve. The resulting bonded structure is shown FIG. 6.

Figure 7:
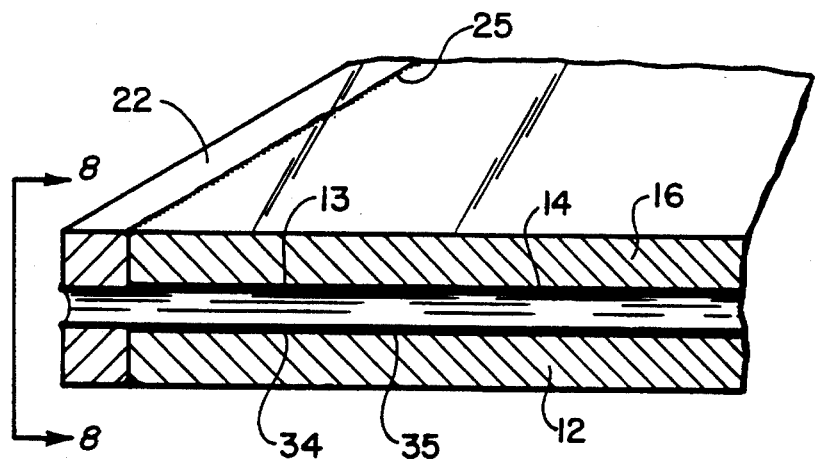
FIG. 7 is a cross-sectional view similar to FIG. 2 showing an alternate apparatus for use with hot isostztic pressing.
Figure 8:
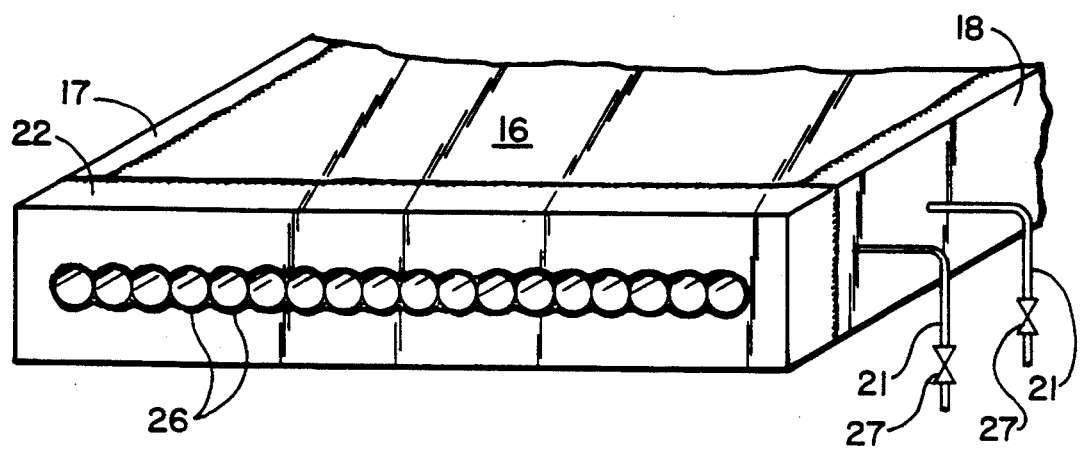
FIG. 8 is an end view of the manifold of FIG. 7 showing the tube ends welded therein.

As an alternative to the conventional bonding method just described, a hot isostatic pressing (HIP) method may be used to obtain the diffusion bonding. As compared to the method disclosed above, the alternative method requires only that a manifold base 22 be sealingly welded 25 to the fixtures 12, 16, side plates 17, 18 and tube ends 23, as shown in FIGS. 7 and 8. The purge lines 21 are then used to perform hydrogen scrub cycles, and the isolated volume is then evacuated, and the valves 27 are closed, resulting in a vacuum acting on the outside 35 of each tube 13. The assembly is then placed into a HIP chamber and heated until a temperature is reached at which the tubes 13 become plastic or superplastic. The force exerted by the high pressure (typically 500 to 30,000 psia) gas in the chamber subjects each tube 13 to a pressure differential sufficient to cause each tube 13 to expand or inflate into intimate contact with adjacent tubes 13 and the first and second members 11, 14. The expanding tubes 13 fill into the interstices 15 and substantially eliminate them. The pressure and temperature are then maintained at a level where each of the tubes 13 diffusion bonds to the adjacent tubes 13 and the first and second members 11, 14.

As an alternative to diffusion bonding, the tubes 13 may be coated with a braze material such as AuNi prior to positioning the tubes 13 within the members 11, 14. After inflation of the tubes 13 into intimate contact with adjacent tubes 13 and the first and second members 11, 14, the temperature is increased to braze temperature, thereby brazing the tubes 13 and members 11, 14 together.

As those skilled in the art will readily appreciate, the dimensional tolerances of the tubes 13 used in the present method are not critical, and therefore manufacturing costs for the tubes 13 can be significantly reduced from the prior art. The resulting tubular thermal structure has defined coolant flowpaths and can be used to assemble large structural panels. In addition, the resulting structural panels can be visually inspected ensure that the interstices 15 have been eliminated, thereby providing a significant improvement over heat transfer structures of the prior art. It will likewise be appreciated that the method disclosed herein is applicable to other types of tubular thermal components, such as tubular combustion chambers for rocket engines, and is not limited to the substantially planar applications discussed herein.

Although this invention has been shown and described with respect to detailed embodiments thereof, it will be understood by those skilled in the art that various changes in form and detail thereof may be made without departing from the spirit and scope of the claimed invention.

I claim:

1. A method of making a thermal structure having coolant flowpaths therein, said structure comprising:

providing first and second fixtures;

positioning a first member onto the first fixture;

positioning a plurality of tubes onto the first member, each tube having an inner surface and an outer surface;

positioning a second member onto the plurality of tubes, thereby sandwiching the tubes between the first and second members and defining interstices bounded by adjacent tubes and the first and second members;

positioning the second fixture onto the first member, thereby fixing the relative positions of the first and second fixtures and the first and second members;

heating the tubes and members to a temperature at which the tubes can be plastically or superplastically deformed;

subjecting each tube to a pressure differential sufficient to cause each tube to expand into intimate contact with adjacent tubes and the first and second members, thereby substantially eliminating the interstices; and, maintaining the pressure and temperature until each of the tubes bonds to the adjacent tubes and the first and second members said tubes defining said coolant flowpaths.

2. The method of claim 1 wherein each of the tubes is plated or coated with braze material prior to the step of positioning the tubes onto the first member, and the step of maintaining the pressure and temperature is preceded by the step of:

heating the assembly to the braze temperature of the braze material.

3. The method of claim 2 wherein the first and second fixtures have a coating of release agent to prevent the tubes from bonding to the fixtures.

4. The method of claim 3 wherein each fixture has a sinusoidal corrugated surface, and each of the first and second members contacts one of the sinusoidal corrugated surfaces.

5. The method of claim 1 wherein the step of maintaining the pressure and temperature is preceded by the step of:

heating the assembly to a temperature at which the tubes diffusion bond together.

6. The method of claim 5 wherein the first and second fixtures have a coating of release agent to prevent the tubes from bonding to the fixtures.

7. The method of claim 6 wherein each fixture has a sinusoidal corrugated surface, and each of the first and second members contacts one of the sinusoidal corrugated surfaces.

8. The method of claim 1 wherein the step of heating the tubes and members to a temperature at which the tubes can be plastically or superplastically deformed is preceded by:

sealingly welding at least one end of each tube to a manifold which communicates with a source of high pressure gas.

9. The method of claim 8 wherein the step of heating the tubes and members to a temperature at which the tubes can be plastically or superplastically deformed is preceded by:

sealing at least one end of each tube to prevent gas from escaping therethrough.

10. The method of claim 8 wherein each of the tubes is coated with braze material prior to the step of positioning the tubes onto the first member, and the step of maintaining the pressure and temperature is preceded by the step of:

heating the assembly to the braze temperature of the braze material.

11. The method of claim 10 wherein the first and second fixtures have a coating of release agent to prevent the tubes from bonding to the fixtures.

12. The method of claim 11 wherein each fixture has a sinusoidal corrugated surface, and each of the first and second members contacts one of the sinusoidal corrguated surfaces.

13. The method of claim 8 wherein the step of maintaining the pressure and temperature is preceded by the step of:

heating the assembly to a temperature at which the tubes diffusion bond together.

14. The method of claim 13 wherein the first and second fixtures have a coating of release agent to prevent the tubes from bonding to the fixtures.

15. The method of claim 14 wherein each fixture has a sinusoidal corrugated surface, and each of the first and second members contacts one of the sinusoidal corrugated surfaces.

16. The method of claim 1 wherein the step of heating the tubes and members to a temperature at which the tubes can be plastically or superplastically deformed is preceded by:

sealingly welding each end of each tube to manifolds which communicate with a source of high pressure gas.

17. The method of claim 16 wherein each of the tubes is coated with braze material prior to the step of positioning the tubes onto the first member, and the step of maintaining the pressure and temperature is preceded by the step of:

heating the assembly to the braze temperature of the braze material.

18. The method of claim 17 wherein each fixture has a sinusoidal corrugated surface, and each of the first and second members contacts one of the sinusoidal corrugated surfaces.

19. The method of claim 16 wherein the step of maintaining the pressure and temperature is preceded by the step of:

heating the assembly to a temperature at which the tubes diffusion bond together.

20. A method of making a thermal structure having coolant flowpaths therein, said structure comprising:

providing first and second fixtures;

providing first and second side plates;

positioning a first member onto the first fixture;

positioning a plurality of tubes onto the first member, each tube having an inner surface and an outer surface;

positioning a second member onto the plurality of tubes, thereby sandwiching the tubes between the first and second members and defining interstices bounded by adjacent tubes and the first and second members;

positioning the second fixture onto the first member, thereby fixing the relative positions of the first and second fixtures and the first and second members;

sealingly securing the first side plate to the first and second fixtures and sealingly securing the second side plate to the first and second fixtures;

sealing securing each end of each tube to manifolds which communicate with a source of high pressure gas and sealingly securing the manifolds to the fixtures and side plates, thereby defining an isolated volume bounded by the fixtures, side plates and manifolds;

evacuating the isolated volume, thereby providing a vacuum therein;

heating the tubes and members to a temperature at which the tubes can be plastically or superplastically deformed;

subjecting each tube to a pressure differential sufficient to cause each tube to expand into intimate contact with adjacent tubes and the first and second members, thereby substantially eliminating the interstices; and, maintaining the pressure and temperature until each of the tubes bonds to the adjacent tubes and the first and second members said tubes defining said coolant flowpaths.

21. The method of claim 20 wherein each of the tubes is coated with braze material prior to the step of positioning the tubes onto the first member, and the step of maintaining the pressure and temperature is preceded by the step of:

heating the assembly to the braze temperature of the braze material.

22. The method of claim 21 wherein each fixture has a sinusoidal corrugated surface, and each of the first and second members contacts one of the sinusoidal corrugated surfaces.

23. The method of claim 20 wherein the step of maintaining the pressure and temperature is preceded by the step of:

heating the assembly to a temperature at which the tubes diffusion bond together.

24. The method of claim 23 wherein each fixture has a sinusoidal corrugated surface, and each of the first and second members contacts one of the sinusoidal corrugated surfaces.

* * * * *

UNITED STATES PATENT AND TRADEMARK OFFICE
CERTIFICATE OF CORRECTION

PATENT NO. : 5,467,528
DATED : November 21, 1995
INVENTOR(S) : Daniel A. Bales, et. al.

It is certified that error appears in the above-indentified patent and that said Letters Patent is hereby corrected as shown below:

Column 2, line 61, replace "elded" with --welded--.

Column 5, line 23, change "corrguated" to --corrugated--.

Column 6, line 18, change "sealing" to --sealingly--.

Signed and Sealed this

Seventh Day of May, 1996

Attest:

BRUCE LEHMAN

Attesting Officer

Commissioner of Patents and Trademarks